United States Patent [19]
Dakin

[11] Patent Number: 4,583,131
[45] Date of Patent: Apr. 15, 1986

[54] METHOD AND APPARATUS FOR STOP-MOTION PLAYBACK OF A RECORD DISC

[75] Inventor: Wayne R. Dakin, Redondo Beach, Calif.

[73] Assignee: Discovision Associates, Costa Mesa, Calif.

[21] Appl. No.: 782,164

[22] Filed: Oct. 2, 1985

Related U.S. Application Data

[60] Continuation of Ser. No. 161,231, Jun. 19, 1980, abandoned, which is a division of Ser. No. 66,620, Aug. 15, 1979, abandoned.

[51] Int. Cl.$^4$ .............................................. G11B 7/00
[52] U.S. Cl. .................................... 358/342; 358/310; 358/335; 358/341; 360/10.1; 360/19.1
[58] Field of Search ............... 358/342, 310, 335, 343, 358/341; 360/19.1, 10.1, 8–10, 32–33, 35–37

[56] References Cited

U.S. PATENT DOCUMENTS

| | | | |
|---|---|---|---|
| 3,789,137 | 1/1974 | Newell | 360/8 |
| 3,878,560 | 4/1975 | Ramage | 360/10 |
| 3,909,512 | 9/1975 | Omori et al. | 360/8 |
| 4,030,129 | 6/1977 | Whitlock | 360/32 |
| 4,065,794 | 12/1977 | Shutterly | 360/10 |
| 4,065,795 | 12/1977 | Shutterly | 360/35 |
| 4,138,694 | 2/1979 | Doi et al. | 358/127 |
| 4,141,039 | 2/1979 | Yamamoto | 358/127 |

FOREIGN PATENT DOCUMENTS 2849791  5/1979  Fed. Rep. of Germany .......... 360/8

OTHER PUBLICATIONS

Ludeman, Extended Audio-Video System, IBM Tech. Disc. Bulletin, vol. 19, No. 5, 10/76, pp. 1546–1547.

Primary Examiner—Robert L. Richardson
Attorney, Agent, or Firm—Ronald J. Clark

[57] ABSTRACT

A video record medium, such as a record disc, for recording a composite video and audio signal suitable for stop-motion playback, with accompanying audio. Discrete segments of an analog audio signal are digitized and compressed in time and recorded on alternate tracks on the disc, and corresponding frames of a video signal are recorded on the tracks located therebetween. During playback of the disc, a selected audio track is scanned initially and the digital audio data recovered therefrom is entered into a memory device, after which the track for recording the corresponding video frame is scanned in a repeated fashion, to produce a stop-motion display of the frame, while the stored audio data is extracted from the memory device and converted back to an analog format, for simultaneous playback at its original speed.

12 Claims, 3 Drawing Figures

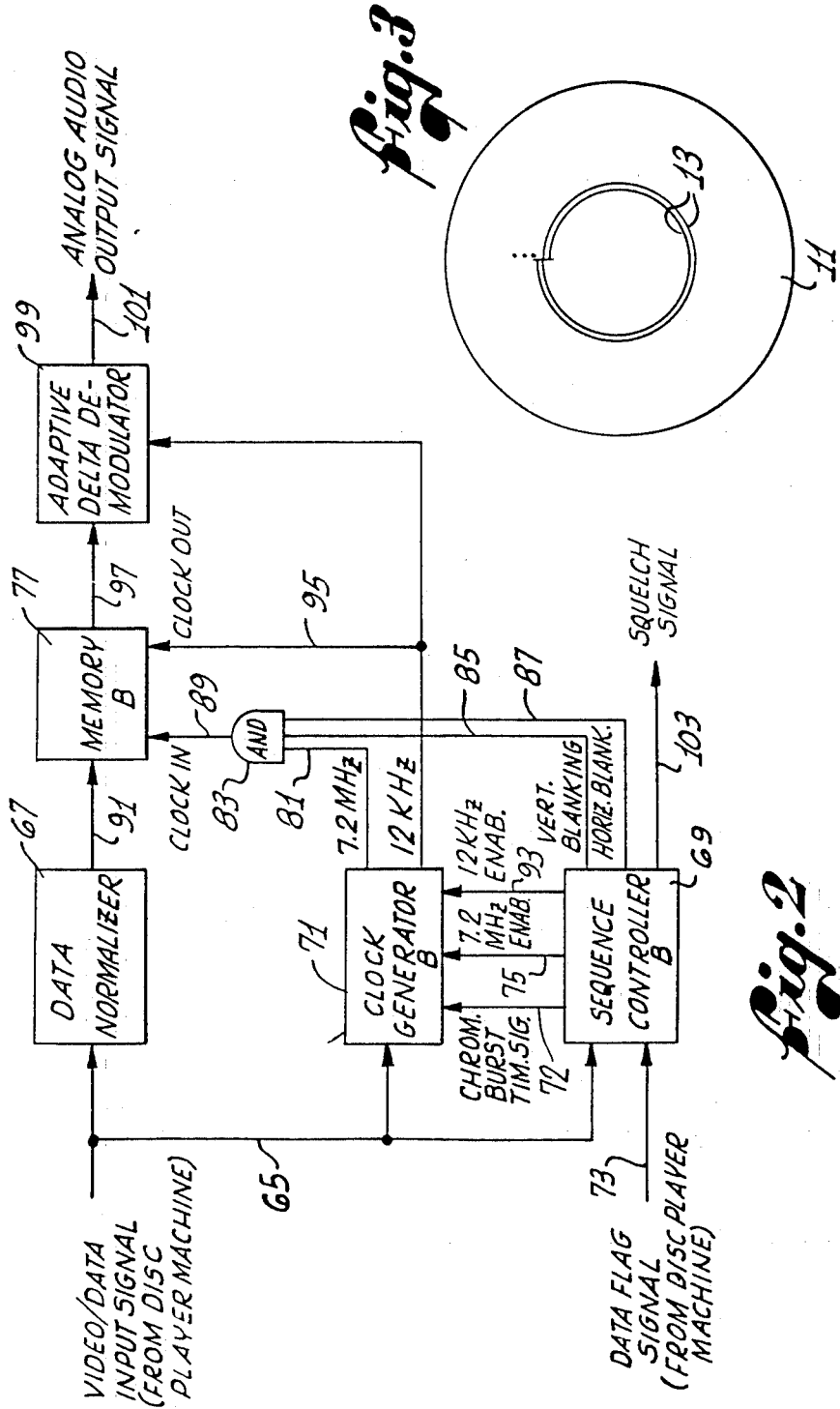

METHOD AND APPARATUS FOR STOP-MOTION PLAYBACK OF A RECORD DISC

This is a continuation of co-pending application Ser. No. 161,231, filed on June 19, 1980 and now abandoned which is a division of application Ser. No. 066,620, filed Aug. 15, 1979 and now abandoned.

BACKGROUND OF THE INVENTION

This invention relates generally to record media for recording video signals and, more particularly, to record media for use with playback apparatus to produce stop-motion video displays.

Record media of this particular type have typically been in the form of record discs and have recorded composite signals that contain both a video signal and an audio signal, simultaneously. The composite signal is normally recorded in a succession of substantially circular and concentrically arranged recording tracks on the disc, with each successive frame of the signal being recorded on a separate track. Stop-motion of a selected video frame is normally accomplished by repeatedly scanning a single track. Since the corresponding audio signal would be meaningless if it, too, were repeated successively, it is normally squelched during this stop-motion playback.

One technique for providing playback of an audio signal while displaying a stop-motion video frame is to record the same video signal on a number of successive recording tracks, but with a unique portion of the audio signal recorded on each track. In this manner, the composite signal can be played back from the record disc in a conventional manner, and the video display will appear to be in stop-motion, but will be accompanied by a normal audio signal. While this technique may prove satisfactory in some situations, it can sometimes be unduly wasteful of recording space on the record disc.

It will thus be appreciated that there is a need for a video recording medium, along with apparatus for formatting a composite signal for recording on the medium and apparatus for suitably processing the signal recovered from the medium, wherein the video signal can be played back in a stop-motion fashion, with an accompanying audio signal, while using a minimum number of recording tracks on the medium. The present invention fulfills this need.

SUMMARY OF THE INVENTION

The present invention is embodied in a record medium for recording a specially-formatted composite signal that includes both a video signal, representative of a video frame, and a corresponding audio signal, wherein the medium is suitable for use with special playback apparatus for displaying the video frame, in a repeated fashion, while accompanied by a playback of a corresponding analog audio signal. In accordance with the invention, the audio signal is recorded in a special time-compressed format on a first portion of the medium, and the video signal is recorded on a second portion of the medium, whereby apparatus for playing the record medium can operate to re-create the analog audio signal corresponding to the time-compressed audio signal, while the video frame is being displayed, repeatedly, a prescribed number of times.

More particularly, a record medium in accordance with the present invention is in the form of a record disc having a succession of substantially circular and concentrically arranged recording tracks. The special time-compressed audio signal is recorded on alternate tracks on the disc, and the corresponding frames of the video signal are recorded on the tracks therebetween. The audio signal is preferably in a digital format, and is arranged in a succession of bit packets that are interleaved with conventional periodic video synchronization signals, whereby the recorded audio signal has the appearance of a conventional video signal with a luminance value that alternates between white and black levels. Additionally, the bit rate of the successive bit packets in the recorded digital audio signal is synchronized with the frequency of periodic chrominance burst signals included in the video synchronization signals, thereby further simplifying detection during playback.

The recorded disc is suitable for playback in a stop-motion fashion, wherein each of the recorded video frames is displayed, in a repeated fashion, a prescribed number of times, while, simultaneously, the corresponding digital audio signal is converted back to an original analog format, for playback at its original speed. Thus, a stop-motion video sequence can be achieved, with accompanying audio, while utilizing a minimum number of recording tracks.

Apparatus in accordance with the present invention, for recording the composite signal on the video record disc, includes digitizing means for converting a conventional analog audio signal into a corresponding digital audio signal having a relatively low bit rate, for clocking into a digital memory device. The apparatus further includes means for clocking the digital data out of the memory to produce a succession of bit packets having a relatively high bit rate, along with means for combining the bit packets with periodic synchronization signals to produce the special digital audio signal for recording on the disc. As a result of the increase in bit rate, the original audio information is substantially compressed in time, permitted approximately 13 seconds of audio information to be recorded on a single track.

The digitizing means preferably comprises a delta modulator, whereby special digital synchronization signals for the digital data are not required. Also, the digital audio signal is low-pass filtered to limit its bandwidth to approximately that of a conventional video signal. This specially-formatted digital audio signal is then combined, in a serial fashion, with a corresponding video signal, and coupled to a conventional disc mastering machine for recording on the disc.

Apparatus for playing back a video record disc in accordance with the present invention includes means for separating the successive packets of the high bit rate digital audio signal interleaved with the periodic video synchronization signals, along with means for loading the separated packets of data into a digital memory device. The apparatus further includes means for clocking the digital data out of the memory device at a relatively slow bit rate, corresponding to its original non-compressed rate, and means for converting this relatively slow digital signal into a corresponding analog audio signal for playback at its original speed.

Simultaneous with the playback of each audio signal segment, the corresponding video signal, recorded on the adjacent track on the disc, is displayed, in a repeated fashion, a prescribed number of times. Each such video frame can include a special code in its vertical interval, indicating the number of times it is to be scanned by the playback apparatus. After this prescribed number of scans, the apparatus performs the same procedure for the next audio/video recording track pair.

Other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 2 is a simplified block diagram of playback formatting apparatus for extracting the time-compressed audio signal from the composite video signal recovered from the video record disc, to recreate the corresponding analog audio signal for playback while a corresponding video frame is being displayed in a stop-motion fashion; and FIG. 3 is a schematic diagram of a video record disc for recording the special composite signal produced by the apparatus of FIG. 1, wherein the time-compressed audio signal and a corresponding video signal are recorded on alternate tracks on the disc.

DESCRIPTION OF THE PREFERRED EMBODIMENT

Figure 1:
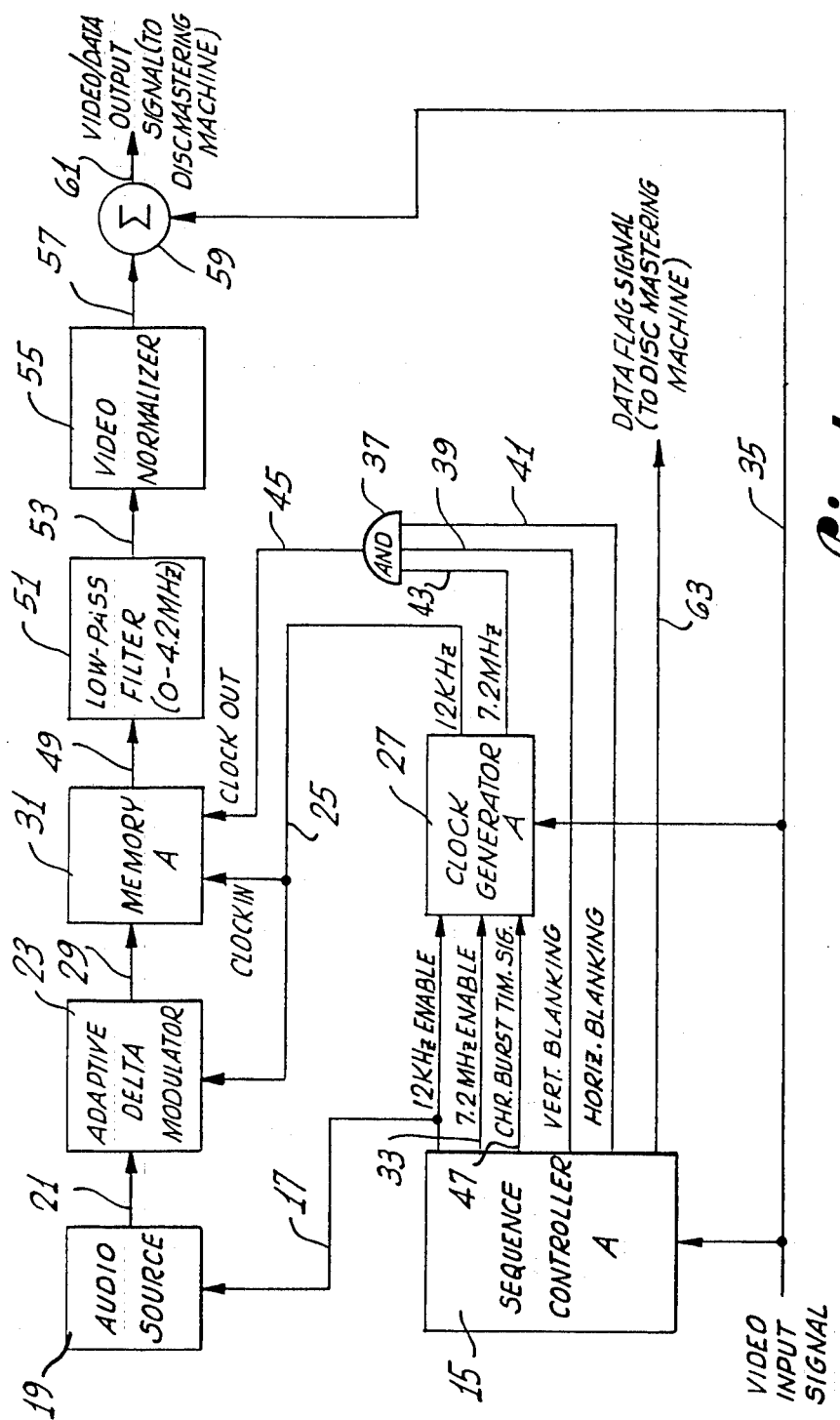
FIG. 1 is a simplified block diagram of record formatting apparatus in accordance with the present invention, for producing a composite video signal that includes a special time-compressed audio signal, for recording on a video record disc, wherein the recorded disc is suitable for playback in a stop-motion fashion, with accompanying audio.

Referring now to the drawings, and particularly to FIG. 1, there is shown a record formatting apparatus for formatting a special composite signal that includes both audio and video information, for recording on a video record disc 11 (FIG. 3). The composite signal is recorded in a succession of substantially circular and concentrically arranged recording tracks 13, and the recorded disc is suitable for playback in a stop-motion fashion, wherein a video frame is displayed, repeatedly, a prescribed number of times, while accompanied by playback of a corresponding audio signal.

In accordance with the invention, the composite signal recorded on the disc 11 is a sequence of information segments alternating between audio information segments and corresponding video information segments, wherein each audio segment comprises a digitized and time-compressed audio signal and each video segment comprises one frame of a video signal. Additionally, each information segment is recorded on a separate track on the disc, so that during playback of the disc, a selected audio track can be scanned a single time and the audio segment recorded thereon can be entered into a memory device, after which the audio information can be extracted and converted back to an analog format, at its original speed, while the corresponding video track is scanned in a repeated fashion, to produce a stop-motion display of the video frame recorded thereon.

More particularly, the record formatting apparatus of FIG. 1 produces a special video/data output signal for coupling to a conventional disc mastering machine (not shown), for recording on the disc 11. The signal has the appearance of a conventional video signal, with its successive frames alternating between frames of the digitized and time-compressed audio signal and corresponding frames of the video signal. The audio frames include conventional periodic video synchronizing signals, interleaved with packets of the digital audio data.

Additionally, although the analog audio signal is initially converted to a digital audio signal having a bit rate of only 12 kilobits per second, the time-compressed digital audio signal recorded on the disc 11 has a bit rate of about 7.2 megabits per second, whereby its bandwidth is comparable to that of a conventional video signal. This increase in bit rate compresses the data in time by a substantial amount, whereby approximately 13 seconds of audio information can be recorded on a single recording track on the disc.

As shown in FIG. 1, operation of the record formatting apparatus is initiated by a sequence controller A 15, by producing a 12 KHz enable signal. This signal is coupled over line 17 to an audio source 19, such as an audio tape recorder, enabling it to produce an analog audio signal to be digitized and recorded on the disc 11. This analog audio signal is coupled over line 21 to an adaptive delta modulator 23, where it is converted to a corresponding low bit rate digital audio signal. The delta modulator is clocked by a 12 KHz clock signal supplied on line 25 from a clock generator A 27, which produces the clock signal whenever enabled by the aforementioned 12 KHz enable signal. One suitable adaptive delta modulator is disclosed in an article written by N. S. Jayant, entitled "Adaptive Delta Modulation with a One-Bit Memory", published in the Bell System Technical Journal, March, 1970.

The digital audio signal produced by the delta modulator 23 has a bit rate of 12 kilobits per second and does not include any special synchronization bits. The digital signal is transmitted over line 29 to the data input terminal of a memory device A 31, where it is loaded by means of the 12 KHz clock signal, supplied on line 25 from the clock generator A 27. The memory device A can advantageously comprise about ten 16K×1 dynamic RAM integrated circuits, arranged in a conventional manner, whereby approximately 13 seconds of the original analog audio signal produced by the audio source 19 can be stored.

It will be appreciated that, alternatively, digital audio data representative of an audio signal duration longer than about 13 seconds could be stored for subsequent recording on more than merely one recording track. This would permit the corresponding video frame to be displayed in a stop-motion fashion, with accompanying audio, for a period longer than about 13 seconds.

After the memory A 31 has been fully loaded with a segment of the digitized audio signal, the sequence controller A 15 automatically terminates the 12 KHz enable signal, to disable the audio source 19 and, likewise, disable the clock generator A 27 from producing the 12 KHz clock signal. Further clocking of audio data into the memory is therefore terminated. Thereafter, the sequence controller A produces a 7.2 MHz enable signal for transmission over line 33 to the clock generator A 27, which responds by producing a 7.2 MHz signal for coupling to the clock out terminal of the memory A, to clock out the stored digital data at a corresponding rate.

A video input signal that includes conventional vertical and horizontal synchronization pulses, along with conventional chrominance bursts, is supplied to the record formatting apparatus on line 35 from video circuitry (not shown). For alternate frames when the digitized and time-compressed audio signal is to be recorded on the record disc 11, the video input signal includes only the periodic synchronization signals, whereby the apparatus can operate to interleave packets of the digitized audio signal therewith.

Accordingly, the 7.2 MHz clock signal is coupled to the clock out terminal of the memory A 31 to clock out the digital audio data only during the periods between the successive synchronization signals. This is accomplished utilizing an AND gate 37 to "AND" together the 7.2 MHz signal and conventional vertical blanking and horizontal blanking signals, the latter two signals being produced by the sequence controller A 15, by continuously monitoring the video input signal.

The vertical blanking signal, which is in the logical "1" state at all times except during the vertical interval of the video signal, and the horizontal blanking signal, which is in the logical "1" state at all times except during the successive horizontal blanking intervals, are coupled over lines 39 and 41, respectively, to two input terminals the AND gate 37. The 7.2 MHz signal is coupled over line 43 from the clock generator A 27 to a third input terminal of the AND gate. As a result, clock pulse bursts are produced by the AND gate and coupled over line 45 to the clock out terminal of the memory A 31, whereby corresponding packets of the digital audio data are produced during the appropriate time intervals.

In accordance with another feature of the invention, the frequency of the 7.2 MHz clock signal coupled to the memory A 31 is synchronized with the frequency of the successive chrominance bursts in the video input signal, supplied on line 35. In particular, the frequency of the 7.2 MHz clock signal is exactly 2×that of the chrominance bursts, which normally have a frequency of 3.579545 MHz. This facilitates a proper detection of the time-compressed digital audio signal by apparatus for playing back the recorded disc 11.

To accomplish this frequency synchronization, the sequence controller A 15 continuously monitors the video input signal supplied on line 35 and produces a chrominance burst timing signal that coincides with the timing of the successive bursts. This timing signal is coupled over line 47 to the clock generator A 27, to gate an internal oscillator and enable it to become synchronized, automatically and in a conventional manner, with the frequency of the successive bursts.

The successive packets of digital audio data output by the memory A 31, at a bit rate of about 7.2 megabits per second, form a time-compressed digital audio signal that is coupled over line 49 from the data output terminal of the memory A to a low-pass filter 51, where the bandwidth of the signal is limited to approximately 4.2 MHz. This bandwidth is comparable to that of a conventional video signal. The filter is preferably a linear-phase filter, to minimize overshoot and intersymbol interference.

The filtered digital signal is coupled over line 53 from the low-pass filter 51 to a video normalizer 55, which adjusts the minimum and maximum values of the filtered signal to levels corresponding to 0 and 100 IRE, respectively. As a result, the full dynamic range of subsequent video circuitry can be fully utilized. Thereafter, the normalized signal is coupled over line 57 to a summer 59, where it is summed with the aforementioned video input signal, supplied on line 35. The resulting video/data output signal has the appearance of a conventional video signal, but with filtered digital data, rather than conventional luminance and chrominance information, in alternate frames. This signal is coupled over line 61 to a conventional disc mastering machine (not shown) for recording on the record disc 11.

After all of the digital audio data has been clocked out of the memory A 31, i.e., sufficient data to complete one video frame, the 7.2 MHz enable signal is terminated by the sequence controller A 15, and the next frame of the video/data output signal comprises conventional video information corresponding to the video input signal, supplied on line 35. After one frame of video signal has been output, the abovedescribed audio signal formatting procedure is repeated, beginning with the enabling of the audio source 19 by the 12 KHz enable signal supplied on line 17 from the sequence controller A.

The successive alternating frames of audio and video information are distinguishable from each other by a suitable flag code recorded in a conventional manner in the respective vertical intervals of the frames. This code can advantageously further indicate the prescribed number of times each video frame is to be repeatedly displayed during subsequent playback of the disc 11, while the corresponding time-compressed audio signal is being converted back to an analog format and played at its original speed. To facilitate the recording of this code in the respective vertical intervals, the sequence controller A 15 produces a data flag signal, indicating which of the alternate video frames includes the time-compressed audio signal. This data flag signal is coupled over line 63 to the disc mastering machine.

With reference now to FIG. 2, there is shown playback formatting apparatus for use in processing a video/data input signal recovered from the record disc 11 by a conventional disc player machine (not shown), to re-create the original analog audio signal, for playback while the associated video frame is being repeatedly displayed the prescribed number of times. In particular, the apparatus operates to extract the successive packets of digital audio data from the video/data input signal and to convert the data back to the original analog audio signal.

As shown in FIG. 2, the video/data input signal is supplied on line 65 from the disc player machine to a data normalizer 67, a sequence controller B 69, and a clock generator B 71. The data normalizer functions to adjust the levels of the input signal such that on alternate frames, when the signal corresponds to the time-compressed audio signal, the input signal is adjusted to levels suitable for subsequent digital processing. The sequence controller B monitors the video/data input signal and, accordingly, produces a chrominance burst timing signal, indicating the occurrence of chrominance bursts in the input signal, and vertical blanking and horizontal blanking signals, indicating the occurrence of vertical and horizontal blanking intervals, respectively, in the input signal. The chrominance burst timing signal is coupled over line 72 to the clock generator B, to gate an internal oscillator and enable it to synchronize with the frequency of the chrominance bursts, which are simultaneously present in the video/data input signal. This is essentially the same technique as previously described in connection with the record formatting apparatus of FIG. 1.

In addition to the video/data input signal, a data flag signal is coupled over line 73 from the disc player machine to the sequence controller B 69 of the playback formatting apparatus. This flag signal indicates that the frame of the video/data input signal currently being supplied on line 65 contains the time-compressed audio signal. Whenever a data flag signal is received, the sequence controller B outputs a 7.2 MHz enable signal for coupling over line 75 to the clock generator B 71, which correspondingly produces a 7.2 MHz clock signal that is synchronized with the periodic chrominance bursts in the video/data input signal. This 7.2 MHz clock signal is utilized in producing clock pulse bursts, synchronized with the video/data input signal, for clocking the successive packets of digital audio data, included in the inut signal, into a memory B 77.

To produce the 7.1 MHz clock pulse bursts, for clocking the digital audio data into the memory B 77, the 7.2 MHz clock signal is coupled over line 81 from the clock generator B 71 to one input terminal of an AND gate 83. Simultaneously, the sequence controller B 69 produces the vertical blanking and horizontal blanking signals for coupling over lines 85 and 86, respectively, to two additional input terminals of the AND gate. The AND gate therefore produces a succession of clock pulse bursts, at a bit rate of 7.2 MHz, coinciding with the timing of the bit packets of the time-compressed digital audio signal portion of the video/data input signal.

This clock pulse burst signal is coupled over line 89 from the AND gate 83 to the clock in terminal of the memory B 77, to load into the memory the successive bits of the normalized video/data input signal, which is coupled over line 91 from the data normalizer 67 to the data input terminal of the memory B. Similar to the memory A 31 of the record formatting apparatus (FIG. 1), the memory B 77 of the playback formatting apparatus (FIG. 2) can advantageously comprise about ten 16K × 1 dynamic RAM integrated circuits, connected in a conventional manner.

After the digital data from one entire frame of the video/data input signal, representative of about 13 seconds of the original analog audio signal, has been clocked into the memory B 77 for storage, the sequence controller B 69 terminates the 7.2 MHz enable signal, to likewise terminate the clock pulse burst signal coupled to the clock in terminal of the memory B. Thereafter, for the following frame of the video/data input signal, i.e., while the video frame corresponding to the stored digital audio data is present, the digital data being stored in the memory B is clocked out at a 12 kilobit per second rate and converted to its original analog format for playback simultaneous with a repeated display of the video frame.

To accomplish this conversion, the sequence controller B 69 outputs a 12 KHz enable signal for coupling over line 93 to the clock generator B 71, which, accordingly, outputs a 12 KHz clock signal for coupling over line 95 to a clock out terminal of the memory B 77. As a result, a 12 kilobit per second intermediate digital data signal is output by the memory B and coupled over line 97 from the output terminal of the memory B to an adaptive delta modulator 99, for conversion back to its original analog format. The demodulator, which is also clocked by the 12 KHz clock signal, can be constructed in a manner set forth in the aforementioned article written by N. S. Jayant.

The analog audio output signal produced by the adaptive delta demodulator 99 is then coupled over line 101 to a suitable audio speaker (not shown) for playback while the player machine is playing back the corresponding video frame for display on a video monitor (not shown), the prescribed number of times. Suitable stop-motion playback apparatus for scanning a selected recording track, in a repeated fashion, and thereby playing back a video frame recorded on the track in a stop-motion fashion, is disclosed in a copending and commonly assigned application for U.S. patent, Ser. No. 890,670 and now abandoned, filed in the name of W. R. Dakin et al. and entitled "Video Disc Player". In a conventional manner, the playback apparatus can be made responsive to the special flag code recorded in the vertical interval of the frame, to scan the track the prescribed number of times.

The sequence controller B 69 of the playback formatting apparatus further operates to produce a squelch signal for output on line 103 whenever an analog audio signal is not being output by the apparatus. This squelch signal can be utilized to insure that the audio signal is coupled to the speaker only when it is being output by the delta demodulator 99.

In an alternative embodiment of the present invention (not shown in the drawings), the time-compressed audio signal recorded on the disc is in an analog format. The signal is formatted by initially periodically sampling the original analog audio signal and storing the successive samples in an analog memory device, such as a charge coupled device (CCD). The successive samples are then extracted from the memory device at a relatively high rate and interleaved with conventional video synchronization signals, to produce the time-compressed audio signal.

From the foregoing description, it should be apparent that the present invention provides a record disc, along with record formatting apparatus for producing a special composite audio and video signal for recording on the disc, and playback formatting apparatus for separating the audio information from the signal recovered from the disc and for re-creating the original analog audio signal, wherein the record disc can be played back in a stop-motion fashion, with accompanying audio, while utilizing a minimum number of recording tracks on the disc. Each segment of the analog audio signal is converted to a digital format and compressed in time, for recording on a single track on the disc, while the corresponding video frame is recorded on an adjacent track.

Although the invention has been described in detail with reference to its presently preferred embodiment, it will be understood by one of ordinary skill in the art that various modifications can be made, without departing from the spirit and scope of the invention. Accordingly, it is not intended that the invention be limited, except as by the appended claims.

I claim:

1. Apparatus for playing a record disc having recorded thereon a special composite signal that includes a digitized and time-compressed audio signal recorded on a first track and a video signal representative of a video frame recorded on a second track, wherein the apparatus operates to produce a stop-motion display of the video frame represented by the recorded video signal, while accompanied by playback of an analog audio signal corresponding to the recorded time-compressed audio signal, said apparatus comprising:
means for scanning the first track of the record disc to recover the time-compressed audio signal recorded thereon, said time-compressed audio signal having a relatively high bit rate;
memory means for storing the digital data included in the recovered time-compressed audio signal;

said means for scanning being further operable, after recovering the time-compressed audio signal, to scan repeatedly the second track of the record disc and recover the video signal recorded thereon;

means for displaying, in a repeated fashion, the video frame represented by the recovered video signal;

means, operable simultaneously with said means for displaying, for extracting the digital data from said memory means to produce an intermediate digital signal corresponding to the time-compressed audio signal, said intermediate signal having a relatively low bit rate; and means for converting the intermediate digital signal to the corresponding analog audio signal for playback simultaneous with the repeated display of the video frame.

2. Apparatus as defined in claim 1, wherein:

the digital data included in the time-compressed audio signal recorded on the first track on the record disc is interleaved with periodic video synchronization signals; and said apparatus further includes means for separating the digital data from the synchronization signals of the time-compressed audio signal recovered from the disc, to produce a succession of packets of digital data for storing in said memory means.

3. Apparatus as defined in claim 2, wherein:

the video synchronization signals include periodic chrominance burst signals having a prescribed frequency;

the bit rate of the time-compressed audio signal recovered from the disc is synchronized with the prescribed frequency of the chrominance burst signals; and said means for separating includes means for detecting the periodic chrominance burst signals and for generating a clock signal having a frequency synchronized therewith, and means, responsive to the clock signal, for detecting the successive bits of the succession of digital data packets.

4. Apparatus as defined in claim 1, wherein said means for converting comprises delta demodulation means.

5. Apparatus as defined in claim 1, wherein:

the recorded video signal includes a flag code signal indicating the number of times the second track is to be scanned by said means for scanning;

said means for scanning includes means for detecting the flag code signal included in the video signal; and said means for scanning scans the second track the number of times indicated by the detected flag code signal.

6. Apparatus for playing a record disc having recorded thereon a special composite signal that includes a digitized and time-compressed audio signal recorded on a first track and a video signal representative of a video frame recorded on a second track, wherein the apparatus operates to produce a stop-motion display of the video frame represented by the recorded video signal, while accompanied by playback of an analog audio signal corresponding to the recorded time-compressed audio signal, said apparatus comprising:

means for scanning the first track of the record disc to recover the time-compressed audio signal recorded thereon, said time-compressed audio signal having a relatively high bit rate;

wherein the digital data included in the time-compressed audio signal recorded on the first track on the record disc is interleaved with conventional periodic video synchronization signals that include periodic chrominance burst signals having a prescribed frequency, and wherein the bit rate of the time-compressed audio signal is synchronized with the prescribed frequency of the chrominance burst signals;

means for separating the digital data from the synchronization signals of the time-compressed audio signal recovered from the disc, to produce a succession of packets of digital data;

memory means for storing the successive packets of digital data derived from the recovered time-compressed audio signal;

said means for scanning being further operable, after recovering the time-compressed audio signal, to scan repeatedly the second track of the record disc and recover the video signal recorded thereon;

means for displaying, in a repeated fashion, the video frame represented by the recovered video signal;

means, operable simultaneously with said means for displaying, for extracting the digital data from said memory means to produce an intermediate digital signal corresponding to the time-compressed audio signal, said intermediate signal having a relatively low bit rate; and delta demodulation means for converting the intermediate digital signal to the corresponding analog audio signal, for playback simultaneous with the repeated display of the video frame.

7. A method for playing a record disc having recorded thereon a special composite signal that includes a digitized and time-compressed audio signal recorded on a first track and a video signal representative of a video frame recorded on a second track, the method producing a stop-motion display of the video frame represented by the recorded video signal, while accompanied by playback of an analog audio signal corresponding to the recorded time-compressed audio signal, said method comprising steps of:

scanning the first track of the record disc with a scanning device to recover the time-compressed audio signal recorded thereon, the time-compressed audio signal having a relatively high bit rate;

storing in a memory device the digital data included in the recovered time-compressed audio signal;

repeatedly scanning the second track of the record disc using the scanning device, after scanning the first track, to recover the video signal recorded thereon;

repeatedly displaying the video frame represented by the video signal, as the video signal is being recovered;

extracting the digital data from the memory device, while repeatedly displaying the video frame, to produce an intermediate digital signal corresponding to the time-compressed audio signal, the intermediate signal having a relatively low bit rate; and converting the intermediate digital signal to the corresponding analog audio signal for playback simultaneous with the repeated display of the video frame.

8. A method as defined in claim 7, wherein:

the digital data included in the time-compressed audio signal recorded, on the first track on the record disc is interleaved with periodic video synchronization signals; and said method further includes a step of separating the digital data from the synchronization signals of the time-compressed audio signal recovered from the disc, to produce a succession of packets of digital data for storing in the memory device.

9. A method as defined in claim 8, wherein:

the video synchronization signals include periodic chrominance burst signals having a prescribed frequency;

the bit rate of the time-compressed audio signal recovered from the disc is synchronized with the prescribed frequency of the chrominance burst signals; and said step of separating includes steps of detecting the periodic chrominance burst signals and generating a clock signal having a frequency synchronized therewith, and using the clock signal to detect the successive bits of the succession of digital data packets.

10. A method as defined in claim 7, wherein said step of converting includes a step of delta demodulating the intermediate digital signal.

11. A method as defined in claim 7 wherein:

the recorded video signal includes a flag code signal indicating the number of times the second track is to be scanned in said step of repeatedly scanning;

said step of repeatedly scanning includes a step of detecting the flag code signal included in the video signal; and said step of repeatedly scanning scans the second track the number of times indicated by the detected flag code signal.

12. A method for playing a record disc having recorded thereon a special composite signal that includes a digitized and time-compressed audio signal recorded on a first track and a video signal representative of a video frame recorded on a second track, the method producing a stop-motion display of the video frame represented by the recorded video signal, while accompanied by an analog audio signal corresponding to the recorded time-compressed audio signal, said method comprising steps of:

scanning the first track of the record disc with a scanning device to recover the time-compressed audio signal recorded thereon, the time-compressed audio signal having a relatively high bit rate;

wherein the digital data included in the time-compressed audio signal recorded on the first track on the record disc is interleaved with periodic video synchronization signals that include periodic chrominance burst signals having a prescribed frequency, and wherein the bit rate of the time-compressed audio signal is synchronized with the prescribed frequency of the chrominance burst signals;

separating the digital data from the synchronization signals of the time-compressed audio signal recovered from the disc, to produce a succession of packets of digital data;

storing in a memory device the successive packets of digital data derived from the recovered time-compressed audio signal;

repeatedly scanning the second track of the record disc using the scanning device, after scanning the first track, to recover the video signal recorded thereon;

repeatedly displaying the video frame represented by the video signal, as the video signal is being recovered;

extracting the digital data from the memory device, while repeatedly displaying the video frame, to produce an intermediate digital signal corresponding to the time-compressed audio signal, the intermediate signal having a relatively low bit rate; and delta demodulating the intermediate digital signal to produce the corresponding analog audio signal, for playback simultaneous with the repeated display of the video frame.

* * * * *